(12) United States Patent
McDonald et al.

(10) Patent No.: US 8,065,131 B2
(45) Date of Patent: Nov. 22, 2011

(54) CONFIGURABLE SYSTEM AND METHOD FOR POWER AND PROCESS PLANT MODELING

(75) Inventors: Larry Keith McDonald, Carson City, NV (US); Scott Terrell Williams, Minden, NV (US); Scott Alden Atkins, Gardnerville, NV (US); Alfred Ong'iro, Carson City, NV (US); Ivan Joseph Johnson, Minden, NV (US)

(73) Assignee: General Electric Company, Schenectady, NY (US)

( * ) Notice: Subject to any disclaimer, the term of this patent is extended or adjusted under 35 U.S.C. 154(b) by 229 days.

(21) Appl. No.: 11/193,698

(22) Filed: Jul. 29, 2005

(65) Prior Publication Data

US 2007/0038321 A1 Feb. 15, 2007

(51) Int. Cl.
*G06G 7/54* (2006.01)
(52) U.S. Cl. ........................................................ 703/18
(58) Field of Classification Search .................... 703/13, 703/18; 702/182
See application file for complete search history.

(56) References Cited

U.S. PATENT DOCUMENTS

| | | | | |
|---|---|---|---|---|
| 4,613,952 A | * | 9/1986 | McClanahan | 703/6 |
| 5,586,066 A | * | 12/1996 | White et al. | 702/181 |
| 5,666,297 A | * | 9/1997 | Britt et al. | 703/18 |
| 5,740,033 A | * | 4/1998 | Wassick et al. | 700/29 |
| 5,812,394 A | * | 9/1998 | Lewis et al. | 700/17 |
| 6,323,882 B1 | * | 11/2001 | Jerome et al. | 715/744 |
| 6,442,512 B1 | * | 8/2002 | Sengupta et al. | 703/6 |
| 6,442,515 B1 | * | 8/2002 | Varma et al. | 703/22 |
| 7,974,826 B2 | * | 7/2011 | Davari et al. | 703/18 |
| 2005/0096872 A1 | * | 5/2005 | Blevins et al. | 702/183 |

OTHER PUBLICATIONS

"Specification and Ordering Information"; System 1® Optimization and Diagnostics Software; Oct. 2005; pp. 1-10; General Electric.
"Decision Support Studio/Developer Edition"; System 1® Optimization and Diagnostics Software; Nov. 2004; 2 sheets; General Electric.
"Bently Nevada Wind Turbine Condition Monitoring and Diagnostics"; System 1® Optimization and Diagnostics Software; Nov. 2004; 2 sheets; General Electric.

(Continued)

*Primary Examiner* — Paul Rodriguez
*Assistant Examiner* — Juan Ochoa
(74) *Attorney, Agent, or Firm* — Armstrong Teasdale LLP

(57) ABSTRACT

A method for simulating an industrial plant includes generating a library of industrial plant component types using user input. The library includes properties of the component types and rules to generate scripts in accordance with property values. The method further includes assembling a configuration of industrial plant components from the library using user input. The configuration is assembled into an editor configured to accept a layout and connection of the configuration of industrial plant components and to accept a configuration and setting of the properties of the industrial plant components. The method also includes generating a script or scripts for industrial plant components in the configuration of industrial plant in accordance with the rules, wherein the generated scripts include mathematical relationships within or among the industrial plant components, or both. The mathematical relationships are then solved. Results are either displayed or used to control an industrial plant.

20 Claims, 7 Drawing Sheets

OTHER PUBLICATIONS

"Machine Performance Condition Monitoring and Diagnostics"; System 1® Optimization and Diagnostics Software; Nov. 2004; 2 sheets; General Electric.

"Specifications and Ordering Information"; Decision Support Studio Developer Edition™; Sep. 2004; pp. 1-2; General Electric Company.

"Specification and Ordering Information"; System 1® Rulepacks; May 2004; pp. 1-4; General Electric.

Blaha, M. et al.; "A Pattern for Softcoded Values"; IEEE; May 2002; pp. 28-34.

"RuleDesk™ Brings Revolutionary Level of Customization to Machine Condition 'Expert System' Software"; News Release on Bently Nevada Corporation Website; May 2001; 2 sheets.

"Bently Nevada Wind Turbine Condition Monitoring and Diagnostics"; System 1® Optimization and Diagnostics Software; Nov. 2004; 2 sheets; General Electric.

"Visual Programming"; Found on website www-lsi.upc.es; Jul. 8, 2002, pp. 1-26.

\* cited by examiner

CONFIGURABLE SYSTEM AND METHOD FOR POWER AND PROCESS PLANT MODELING

BACKGROUND OF THE INVENTION

This invention relates generally to computer-implemented methods and apparatus for modeling, and more particularly to such methods and apparatus for modeling process and industrial plants, including, for example, power plants.

In known systems for modeling power and process plants, addition of a new component type would require writing computer code specifically designed for that component type. Usually, the persons having specialized engineering knowledge of industrial plants are not professional programmers and are not expert at writing computer code. Thus, changes would normally have to be contracted out to a software team. Months of testing might then ensue as the software is modified, recompiled, and tested. A software product using such code would then have to be re-released in a new version, with all the attendant expenses of each product release and the inconvenience of customers.

BRIEF DESCRIPTION OF THE INVENTION

One aspect of the present invention therefore provides a computer-implemented method for simulating an industrial plant. The method includes generating a library of industrial plant component types using user input. The library that is input includes properties of the component types and rules to generate scripts in accordance with property values. The method further includes assembling a configuration of industrial plant components from the library using user input. The configuration is assembled into an editor configured to accept a layout and connection of the configuration of industrial plant components and to accept a configuration and setting of the properties of the industrial plant components. The method also includes generating a script or scripts for industrial plant components in the configuration of industrial plant in accordance with the rules, wherein the generated scripts include mathematical relationships within or among the industrial plant components, or both. The mathematical relationships are then solved and the results are either displayed or transmitted in a manner to control an industrial plant in accordance with the results.

In another aspect, the present invention provides a computer system having a display, a processor, a pointing device, and memory, wherein the memory includes instructions configured to instruct the processor to generate a library of industrial plant component types using user input, including properties of the component types and rules to generate scripts in accordance with property values. The instructions also are configured to assemble a configuration of industrial plant components from the library using user input. An editor is configured to accept a layout and connection of the configuration of industrial plant components and to accept a configuration of the properties of the industrial plant components. The instructions are also configured to instruct the processor to set properties of the industrial plant components in the assembled configuration and to generate a script or scripts for industrial plant components in the configuration of industrial plant in accordance with the rules, wherein the generated scripts include mathematical relationships within or among the industrial plant components, or both. The instructions are further configured to instruct the processor to solve the mathematical relationships and to display results of the solution of the mathematical relationships.

In yet another aspect, the present invention provides a machine-readable medium having recorded thereon instructions configured to instruct a computer system having a display, a processor, a pointing device, and memory, to generate a library of industrial plant component types using user input. The library includes properties of the component types and rules to generate scripts in accordance with property values. The instructions are further configured to instruct the processor to assemble a configuration of industrial plant components from the library using user input into an editor configured to accept a layout and connection of the configuration of industrial plant components and to accept a configuration of the properties of the industrial plant components. The instructions are further configured to instruct the processor to set properties of the industrial plant components in the assembled configuration, generate a script or scripts for industrial plant components in the configuration of industrial plant in accordance with the rules, wherein the generated scripts include mathematical relationships within or among the industrial plant components, or both, and solve the mathematical relationships. The instructions are also configured to instruct the processor to either display results of the solution of the mathematical relationships or transmit signals in accordance with the results to control an industrial plant in accordance with the results, or both.

Thus, using various configurations of the present invention, service engineers, as users, can model a power plant or other industrial plant using existing equipment definition files and set properties to values that match actual equipment settings. Users can also develop rules that govern behavior between instances of the modeled equipment to produce optimal settings for an entire plant. In contrast with previous systems, embedded rules in software code need not be modified, thereby avoiding having to contract changes to a software team or to require service engineers to have the tools and knowledge necessary to make code modifications and testing. Therefore, months of modification and testing can be saved by allowing service engineers to create rules that need not be embedded in software and that do not require the modification or recompiling of any software code. Instead, rules can be created and tested by a service engineer having knowledge of plant equipment rather than a software team having knowledge of software.

Moreover, sustaining engineers as users can create new equipment definition files with configurable properties. Such files can follow a documented schema. Sustaining engineers can also use the equipment definition file to develop rules to govern behavior between properties of the equipment to produce optimal settings for one or more specific equipment types. These capabilities contrast with those of prior systems that required modification of software code to define a new equipment type. The new system will allow users to define a new equipment type, its properties, and the rules that govern its behavior without modifying or recompiling any software code.

DETAILED DESCRIPTION OF THE INVENTION

Configurations of the present invention include computer-implemented methods and apparatus for modeling, and more particularly methods and apparatus for modeling process and industrial plants, including, for example, power plants. Technical effects of some configurations of the present invention include the facilitation of the creation of equipment definition files with configurable properties and the development of rules to govern behavior of equipment to produce optimal settings for one or more specific equipment types. Also, technical effects of various configurations of the present invention include, but are not limited to, facilitating the definition of new equipment types, properties, and rules that govern equipment behavior.

Figure 1:
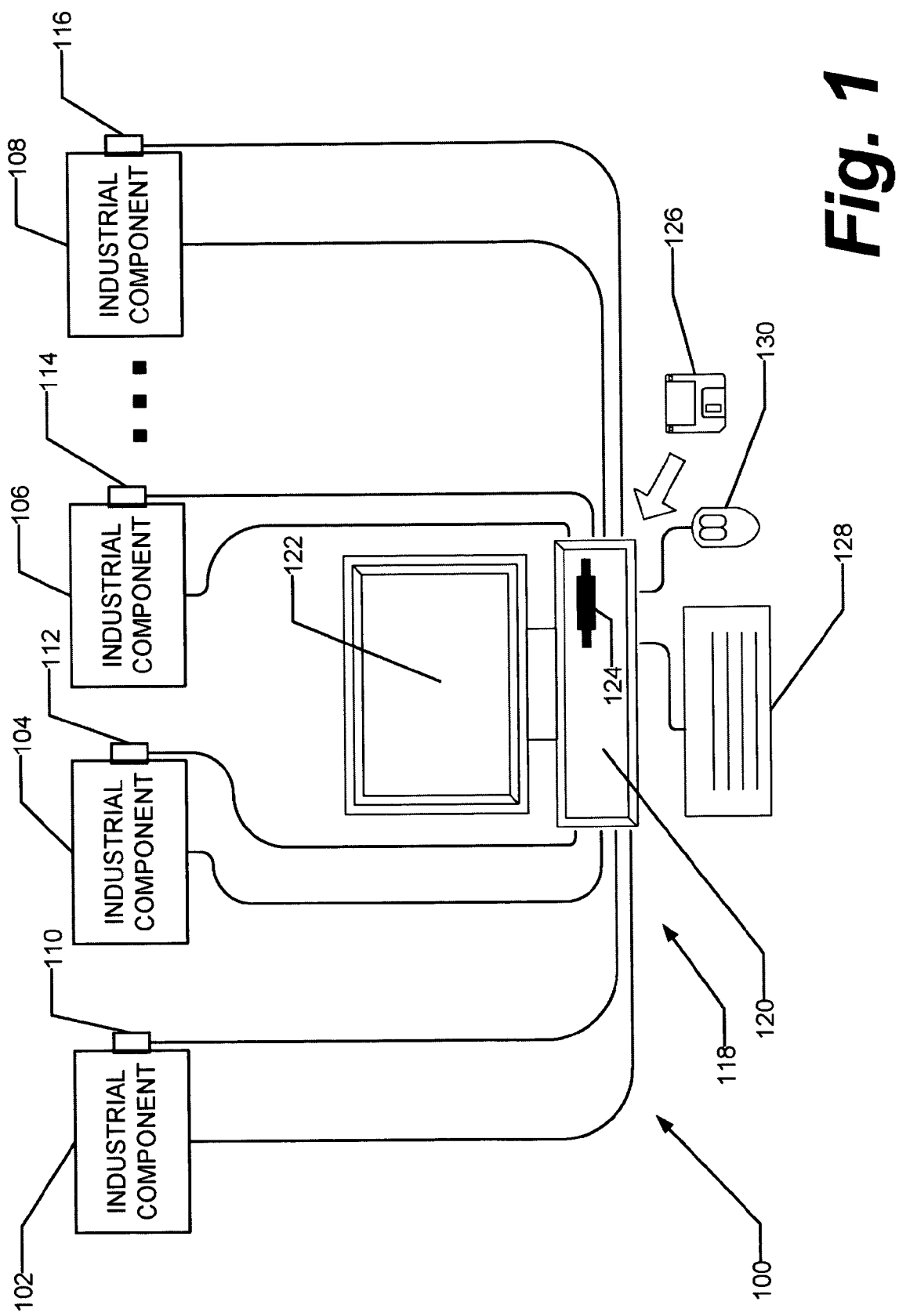
FIG. 1 is a block schematic diagram representative of a computer system used in some configuration of the present invention.

Referring to FIG. 1, some configurations of the present invention comprise a computer system 118 having a display 122, a processor 120, a user input device such as a keyboard 128, a pointing device 130 such as a computer mouse (other pointing devices are acceptable as a design choice), and memory (not all of which is shown in FIG. 1, but which may include primary memory such as RAM and ROM, and/or storage devices such as flash memory, EEPROM, floppy disks 126 and floppy disk drive 124, CD-ROM, CD-R, CD-RW, magnetic tape, DVD-ROM, DVD-R, DVD-RW, DVD+R, DVD+RW, hard drives, and various types of magnetic, optical, and electronic or electrostatic storage devices and drives without limitation. Some configurations of the present invention are located at an industrial plant 100 and include one or more sensors 110, 112, 114, 116 that are configured to sense conditions of a corresponding set of one or more operating physical industrial components 102, 104, 106, 108. Computer system 118 is configured to receive these signals in these configurations and to use them in a manner described in detail below. Also, some configurations of the present invention are configured to transmit signals to one or more of physical industrial components 102, 104, 106, 108 (not necessarily the same as those being sensed by sensors 110, 112, 114, 116 in all configurations) to control industrial plant 100. However, not all configurations of the present invention require that computer system 118 be configured to control industrial plant 100 and/or to sense conditions of one or more physical industrial components 102, 104, 106, 108. Also, in configurations of the present invention that do control industrial plant 100 and/or input sensed parameters of physical industrial components, such input and/or control can be provided by receiving and/or transmitting signals from or to one or more separate software or hardware system that more directly interact with physical components of the plant and/or sensors.

Figure 2:
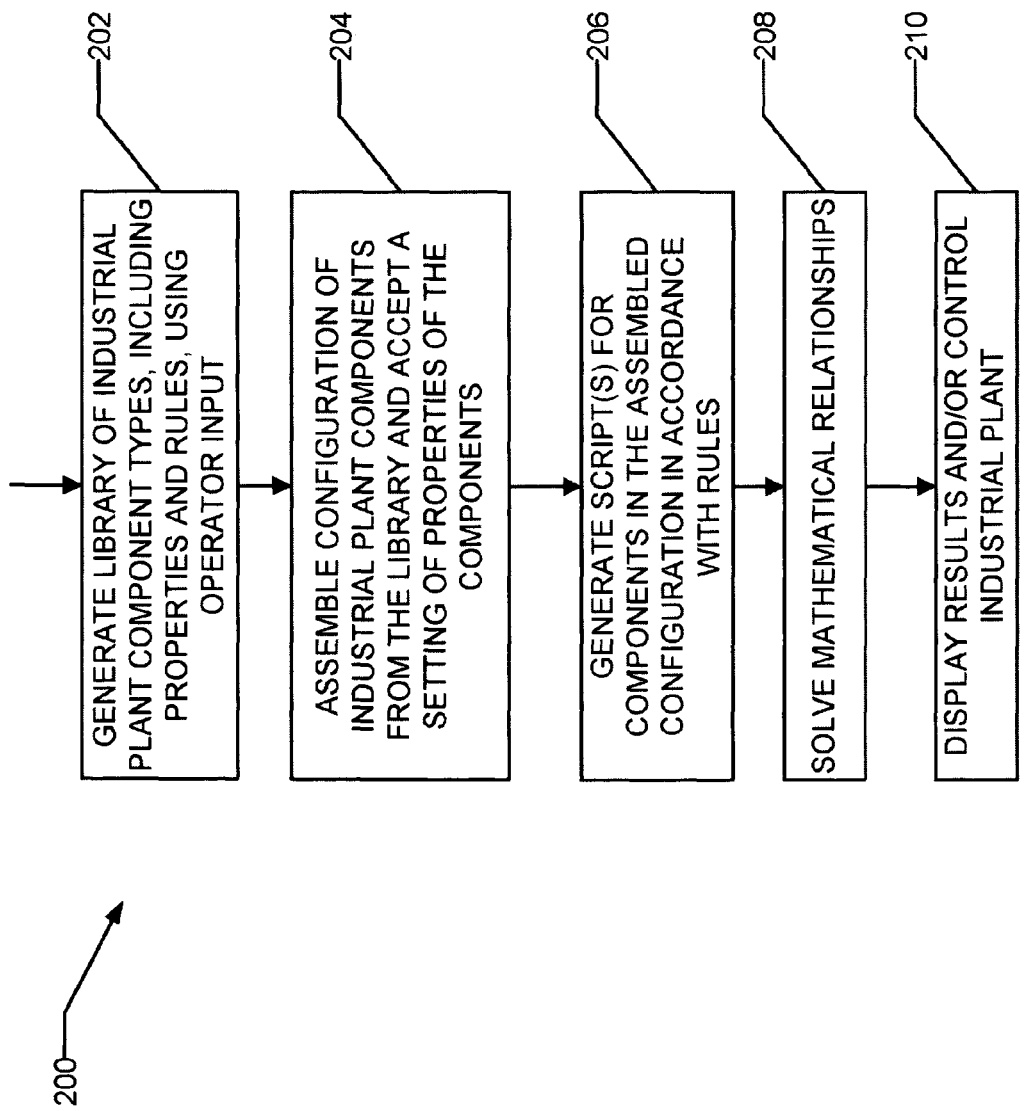
FIG. 2 is a flow chart representative of some methods used in configurations of the present invention.
Figure 3:
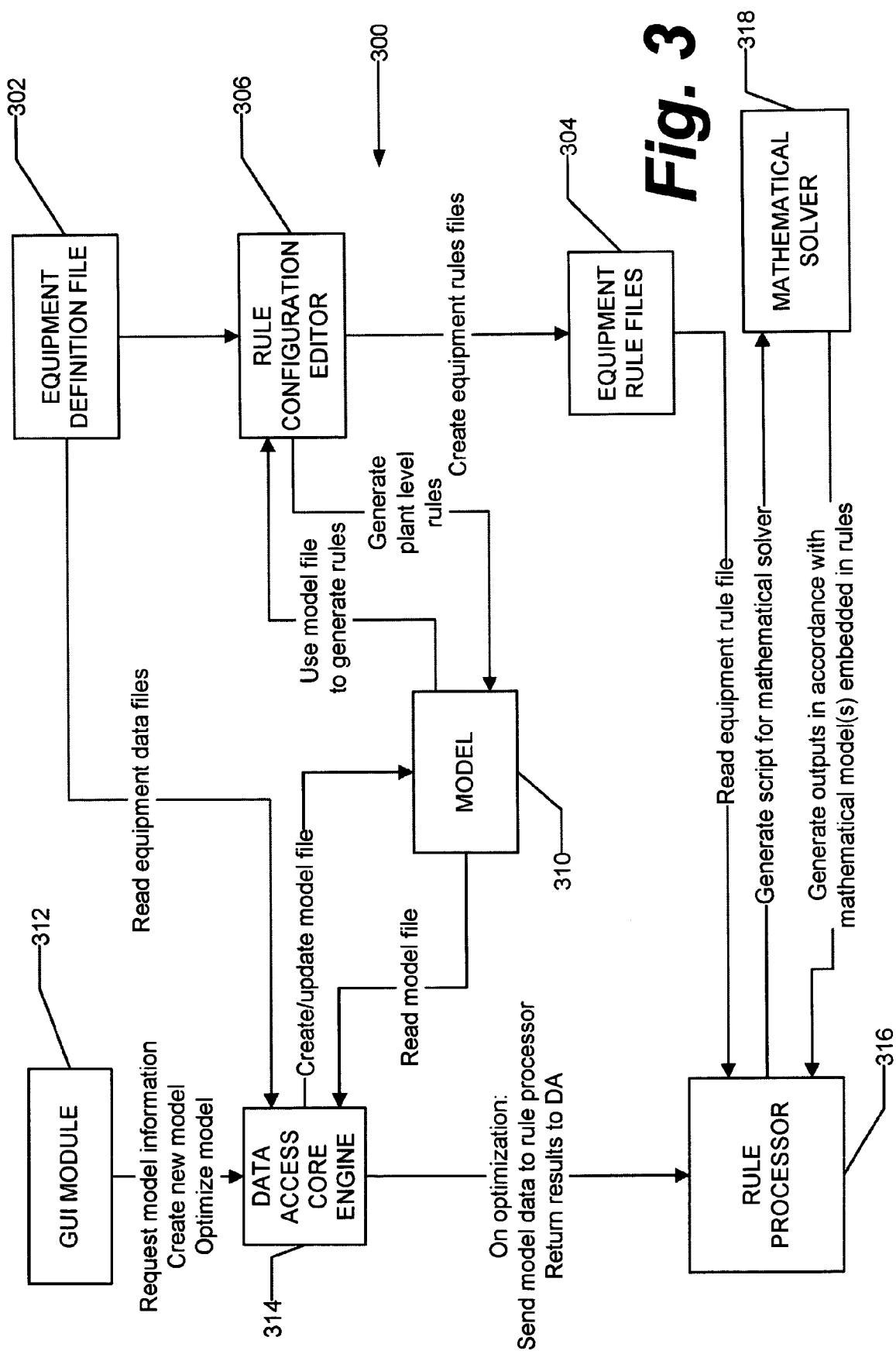
FIG. 3 is an architectural diagram of a software program used in some configuration of the present invention.

Within the memory (in some configurations, on a machine-readable medium such as a floppy disk 126, and/or any of the various types of CDs, DVD, and/or flash memory, ROM cartridge, etc.) and referring to FIG. 1, flow chart 200 of FIG. 2, and software architecture chart 300 of FIG. 3, instructions are written or otherwise included that are configured to instruct processor 120 to generate 202 a library ("equipment definition file") 302 of industrial plant component types using user input. In some configurations, user input at 202 and the generated library includes properties of the component types as well as rules to generate scripts in accordance with property values. These property values can be entered later. In some configurations of the present invention, the library of component types can include non-physical components, such as economical or legal components. Examples of economic components are fuel purchases and sales, and examples of legal components are emission limits and credits. These non-physical components can be modeled with mathematical rules, just as components representing physical equipment can be modeled with mathematical rules.

Figure 4:
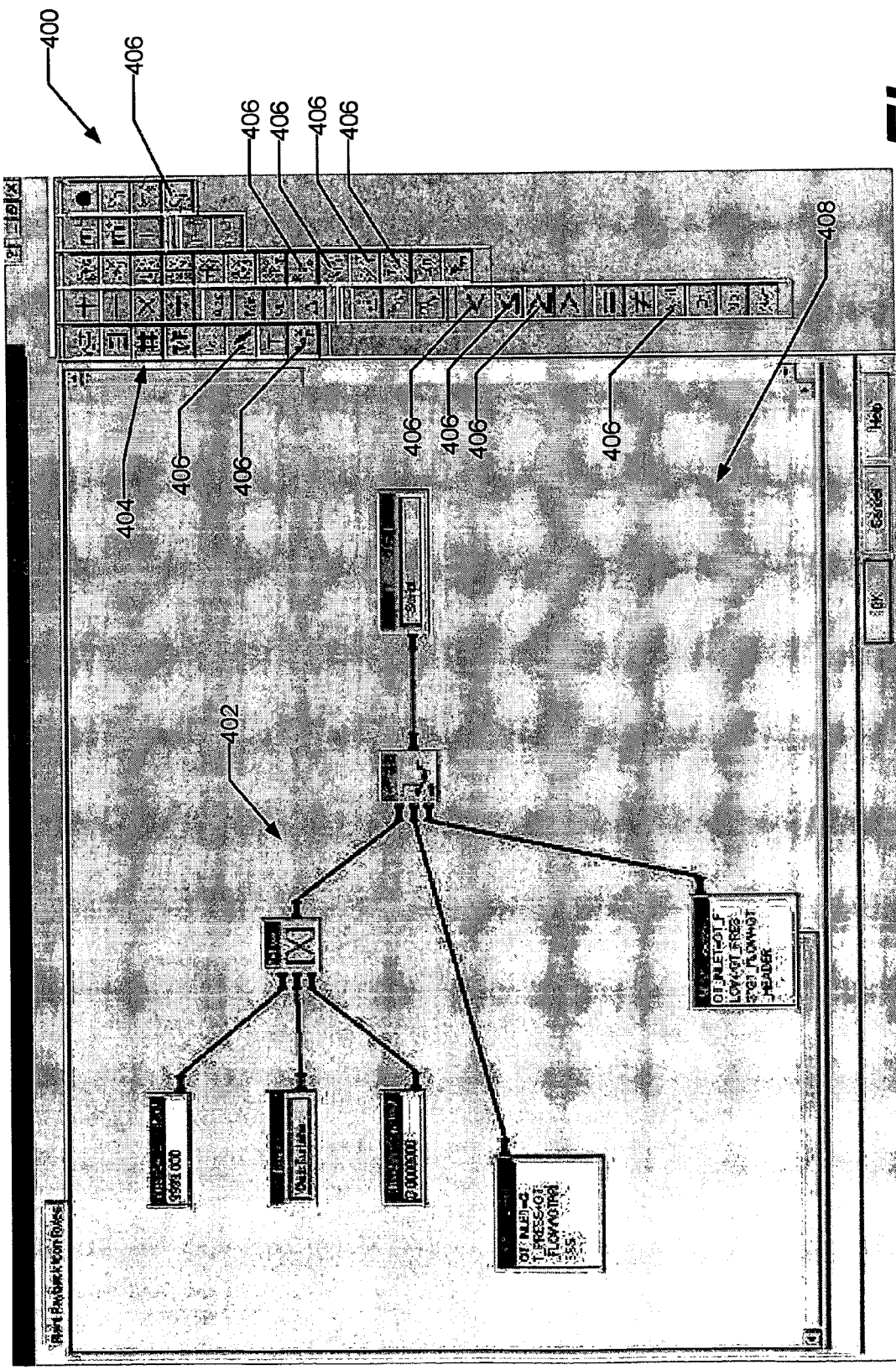
FIG. 4 is a screen shot of a rule editing screen such as that provided in some configuration of the present invention.

In some configurations and referring to screenshot 400 of FIG. 4, Rules 402 can be entered graphically. For example, some configurations include instructions that instruct the processor to display a set of operators 406, such as mathematical operators and text operators, in a palette 404 and drag operators 406 from palette 404 to an active editing area 408 of the screen of in accordance with user input. Also in accordance with user input, the instructions are configured to connect the dragged operators 406 and apply these operators to properties.

Returning to FIG. 3, equipment definition file 302 is also used in some configurations of the present invention to create rules 304 for each industrial plant component ("equipment") type, which, as described above, may also include non-physical components. Also, using equipment definition file 302 a graphical user interface (GUI) module 312 can be used in some configurations to create a model file 310 by using the available equipment and specifying values to the properties of the equipment. GUI module 312 can perform an optimization on the model data. Developed rules 304 and model data 310 generated by assembling a configuration of industrial plant components using GUI module 312 and data access (DA) core engine 314 are fed to a rule processor 316 which generates script to be solved by a mathematical solver 318, which generates optimized outputs based on the given data. Output values are returned to GUI module 312 and displayed to the user and model file 310 is updated with the optimized values in some configurations of the present invention.

In some configurations of the present invention and returning to FIG. 2, the instructions are further configured to assemble 204 a configuration of industrial plant components from the library. For example and referring to graphical user interface (GUI) screenshot 500 of FIG. 5, a configuration 502 of industrial plant components 504 is laid out to create a model of a power plant. An Icon Palette 506 provides a library of industrial component ("equipment") types that a user can select to model equipment in an actual or hypothetical power plant. Each component icon 504 has several properties 508 that can be used by a user to enter specific values matching operating conditions of an actual or hypothetical power plant being modeled.

Figure 5:
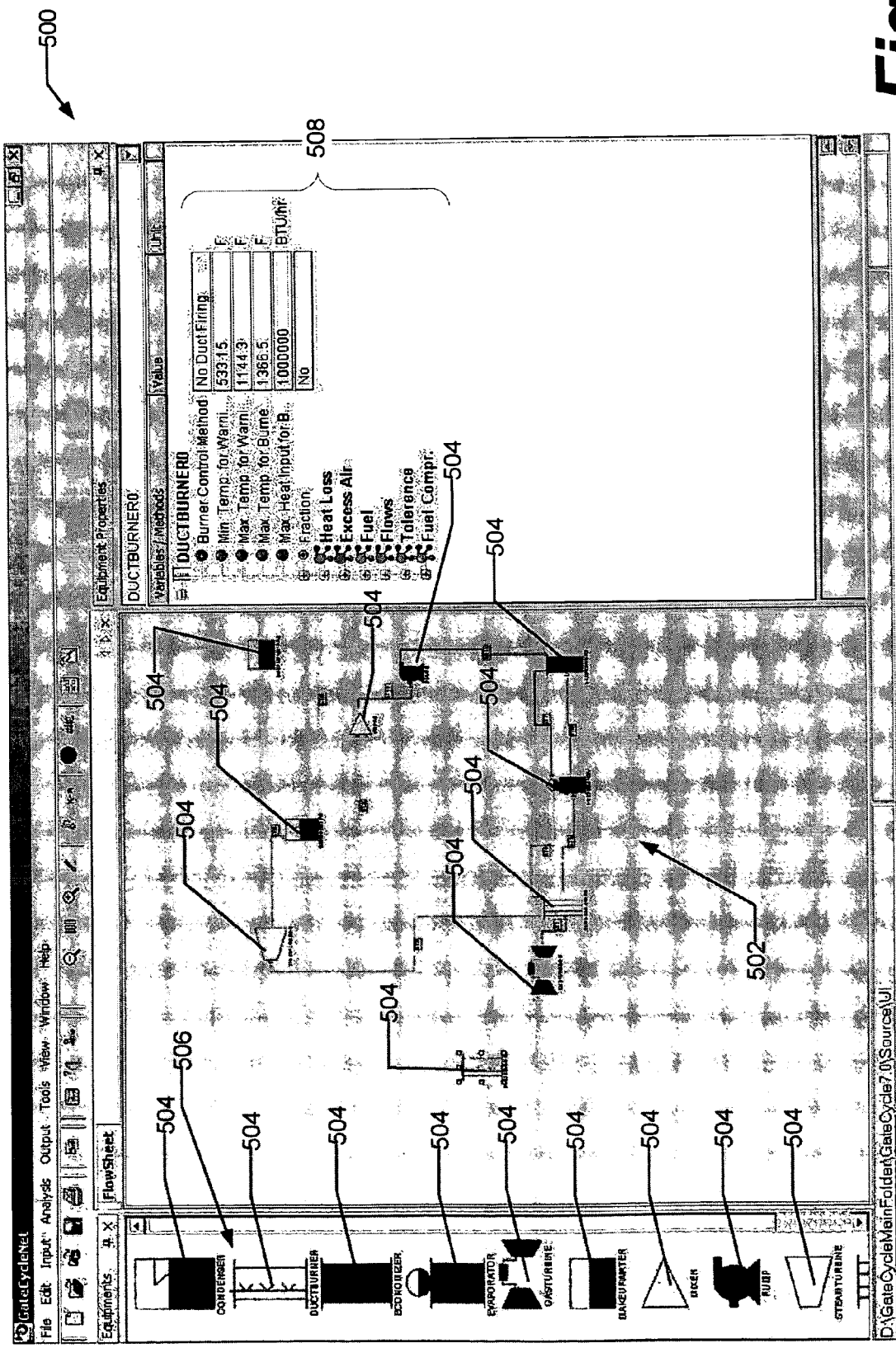
FIG. 5 is a screen shot of a configuration assembly screen such as that provided in some configurations of the present invention.

Referring again to FIG. 3 as well as FIG. 5, assembly of a configuration is accomplished by a user who inputs a layout and connection of components into a GUI configured such as by DA core engine 314 to accept such input. The GUI also accepts from the user a set of property values 508 for the components. In some configurations, to assemble a configuration of industrial plant components from the library using user input, the instructions are further configured to instruct the processor to display a plant diagram 502, display industrial plant component types 504 in a palette 506, and move and instantiate user-selected industrial plant component types 504 into plant diagram 502 in response to user input, such as by clicking and dragging mouse 130. ("Move" here is also intended to encompass configurations that copy and then move the selected industrial plant component types.) In some configurations and referring again to FIG. 1, the instructions are further configured to instruct processor 120 to receive signals from sensors such as 110, 112, 114, and/or 116 that sense conditions of physical components 102, 104, 106, 108, respectively, in an industrial plant 100. The physical components correspond to the industrial plant component icons in the assembled configuration 502 being simulated. In some configurations, the instructions are also configured to use the received signals from these sensors to set property values 508 of the industrial plant components in assembled configuration 502 that correspond to the physical components 102, 104, 106 and/or 108 that are being sensed. In some configurations, economical and/or legal components are also used as input and provided as component types 504 along with industrial plant component types. For example, information about fuel purchases or sales by a power plant and/or emission limits or credits can be entered via keyboard 128, pointing device 130, removable media 126, or via a public or private network communicating with processor 120. Also in some configurations, processor 120 does not interconnect with physical sensors such as 110, 112, 114, and/or 116, but rather information regarding the operation of physical components such as 102, 104, 106, and 108 is entered into processor 120 via the same methods described for economical and/or legal components. Thus, it is not necessary to interconnect processor 120 with any industrial components at all in some configurations, and at least some configurations of the present invention either do not provide the ability to do so or make such interconnections optional.

Figure 6:
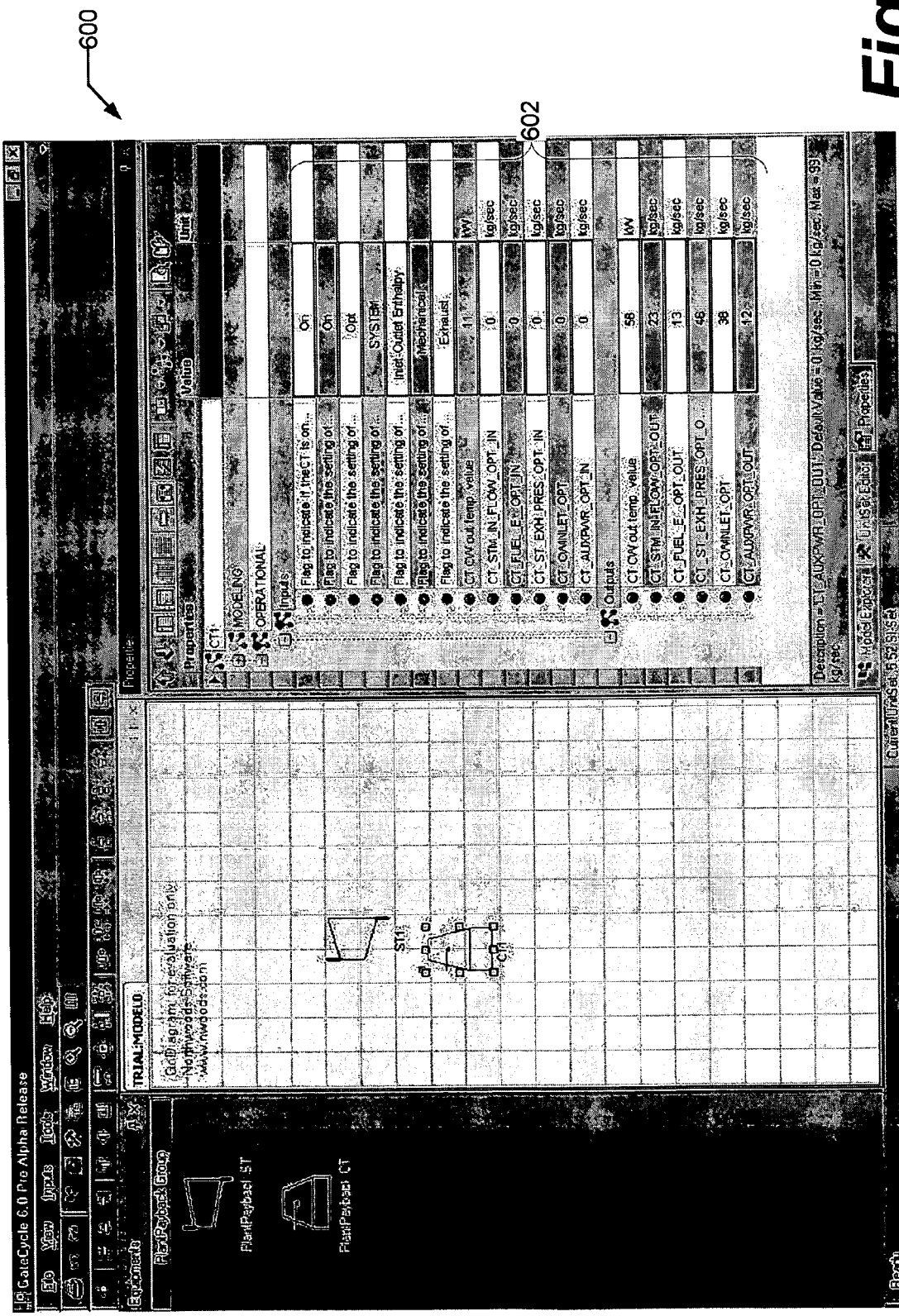
FIG. 6 is a screen shot of a result display such as that provided in some configurations of the present invention.

Also referring to FIG. 2 as well, the instructions are also configured to generate 206 a script or scripts (such as a Lingo script) from the components 504 selected for configuration 502 in accordance with the rules. The script or scripts includes mathematical relationships within and/or among the selected industrial components. The instructions are further configured to provide a solving engine such as Lingo script interpreter 318 and/or rule processor 316 (either alone or in combination) that instructs processor 120 to solve 208 the mathematical relationships and to display 210 the results of the solution on the display or on a printer and/or use the results to control industrial plant 100. A typical result display is shown in screenshot 600 of FIG. 6, which can be displayed, for example, using GUI module 312. Results 602 in this configuration are shown in a tabular format. The results can be optimized in accordance with selected criteria.

Figure 7:
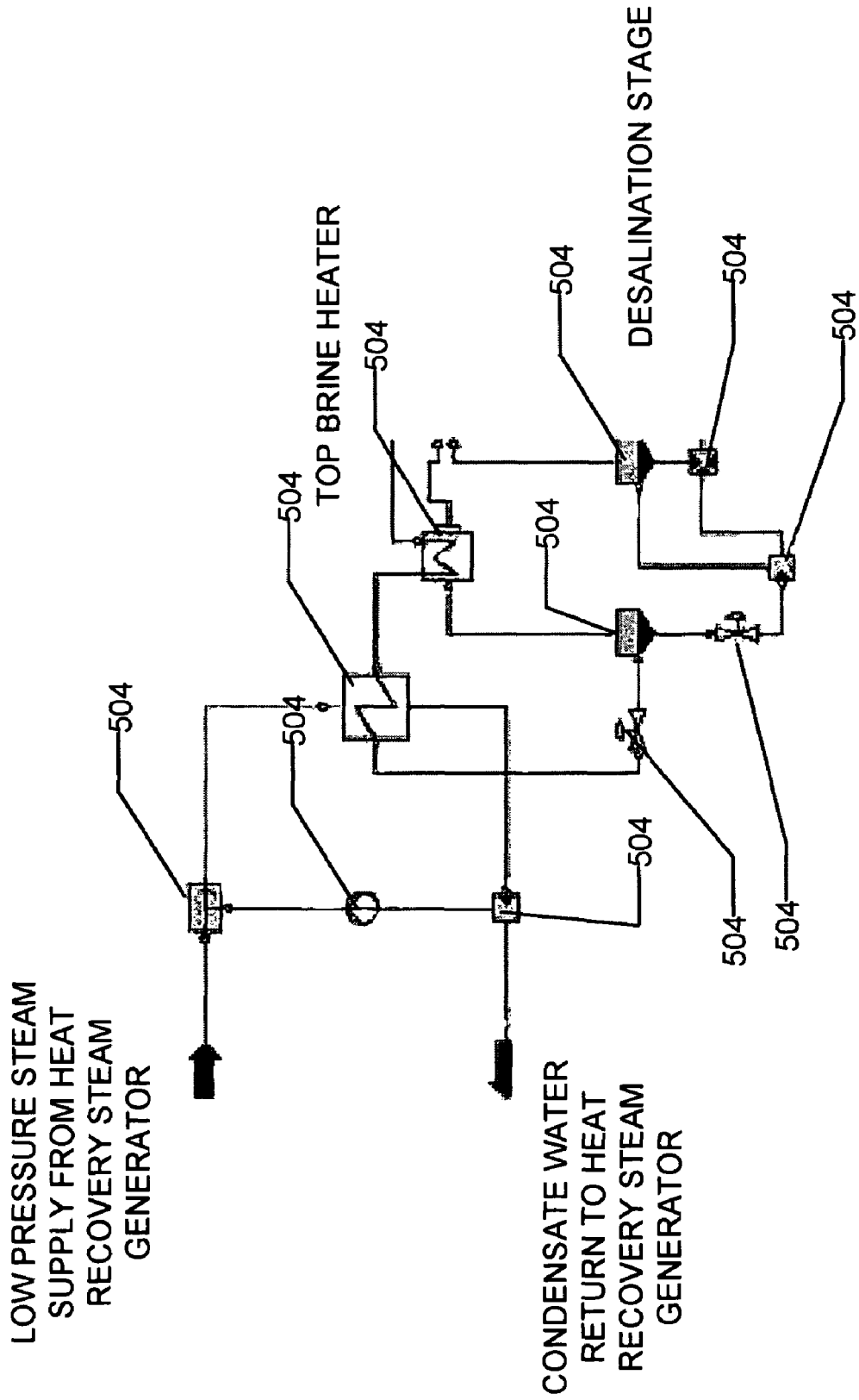
FIG. 7 is a assembled configuration of components useful for simulating a desalinization plant in some configurations of the present invention.

Although some configurations of the present invention are particularly suitable for simulation of power generating plants, the present invention is not limited solely to such simulations and can be used for various industrial plants. For example, an assembled configuration of components 504 for simulating a desalinization plant is shown in FIG. 7.

Also, some configurations of the present invention provide a computer-implemented method for simulating an industrial plant. Referring again to FIGS. 1 and 2, a library of industrial plant component types 202 is generated by a computer 118 using user input. The library includes properties of component types and also rules to generate scripts in accordance with property values of the components.

A configuration of industrial plant components is then assembled 204 by computer 118 from the library. User input is used by computer 118 to assemble this configuration into an editor. The editor is configured to accept a layout and connection of the configuration of industrial plant components and to accept a configuration of properties and setting of the properties of the industrial plant components. Next, a script or scripts are generated 206 for industrial plant components in the industrial plant component configuration in accordance with the rules to generating scripts. The generated scripts include mathematical relationships within and/or among the industrial plant components, including economical and/or legal components, if used in the industrial plant component configuration. Computer 118 solves 208 the mathematical relationships and displays 210 results of the solution and/or transmits signals in accordance with the results. In configurations in which signals are or can be transmitted, they are or can be used to control an industrial plant in accordance with the results of the solution. Otherwise, results are displayed or printed on a printer (not shown) and used for setting physical equipment parameters and/or determining and/or using determined non-physical parameters, such as fuel purchases and/or sales, or use of emission credits.

Also, in some configurations and referring also to FIG. 4, the generation 202 of a library of industrial plant component types using user input further comprises displaying a set of operators 406 in a palette 404, dragging operators from the palette in accordance with user input, connecting the dragged operators in accordance with user input, and applying the operators to properties in accordance with user input. In this manner, rules are created. In some configurations of the present invention, the rules are a set of mathematical operators as well as text manipulation operators that are used for script generation. The rules that are developed are interpreted by a rule processor to generate the script that can be accepted by a mathematical solver.

In some configurations and referring also to FIG. 5, assembling 202 a configuration of industrial plant components from the library using user input further comprises displaying a plant diagram 502, displaying the industrial plant component types 504 in a palette 506, and moving and instantiating user-selected industrial plant component types 504 into plant diagram 502 in response to user input.

Further, in some configurations and referring also to FIG. 1, setting the properties of industrial plant components 504 in assembled configuration 502 further comprises receiving signals from sensors 110, 112, 114, 116 sensing conditions of physical components 102, 104, 106, 108 in an industrial plant 100 that correspond to industrial components 504 in the assembled configuration, and using the received signals to set the properties of the corresponding industrial plant components in the assembled configuration.

Also, in some configurations, rules are validated as they are entered. Thus, every rule is guaranteed to be operational in the sense not causing syntax errors when executed or interpreted. (Syntax validation does not necessarily confirm that the rules are logical in the sense of doing what the user intends.) Some configurations provide an optimization engine to optimize the simulated process according to criteria selected and entered by the user.

Thus, using various configurations of the present invention, service engineers, as users, can model a power plant or other industrial plant using existing equipment definition files and set properties to values that match actual equipment settings. Users can also develop rules that govern behavior between instances of the modeled equipment to produce optimal settings for an entire plant. In contrast with previous systems, embedded rules in software code need not be modified, thereby avoiding having to contract changes to a software team or to require service engineers to have the tools and knowledge necessary to make code modifications and testing. Therefore, months of modification and testing can be saved by allowing service engineers to create rules that need not be embedded in software and that do not require the modification or recompiling of any software code. Instead, rules can be created and tested by a service engineer having knowledge of plant equipment rather than a software team having knowledge of software.

Moreover, sustaining engineers as users can create new equipment definition files with configurable properties. Such files can follow a documented schema. Sustaining engineers can also use the equipment definition file to develop rules to govern behavior between properties of the equipment to produce optimal settings for one or more specific equipment types. These capabilities contrast with those of prior systems that required modification of software code to define a new equipment type. The new system will allow users to define a new equipment type, its properties, and the rules that govern its behavior without modifying or recompiling any software code.

While the invention has been described in terms of various specific embodiments, those skilled in the art will recognize that the invention can be practiced with modification within the spirit and scope of the claims.

What is claimed is:

1. A computer-implemented method for simulating an industrial plant, said method comprising:
   generating a library of industrial plant component types using user input, wherein the library includes at least one economical component that represents at least one of a fuel purchase and a fuel sale, at least one legal component, and properties of one or more user-created component types and user-defined component types and existing component types, the library further including mathematical and text manipulation rules for use in generating scripts in accordance with property values;
   assembling a configuration of industrial plant components from the library using user input into an editor configured to accept a layout and connection of the configuration of industrial plant components and to accept a configuration and setting of the properties of the industrial plant components, wherein the properties of the industrial plant components are set based on signals received from the assembled configuration;
   setting properties of the industrial plant components;
   generating a script or scripts for industrial plant components in the configuration of industrial plant components in accordance with the rules, wherein said generated scripts include mathematical relationships within or among the industrial plant components, or both;
   solving the mathematical relationships; and
   at least one of displaying results of the solution of the mathematical relationships and transmitting signals in accordance with said results to control an industrial plant in accordance with said results.

2. A method in accordance with claim 1 wherein said generating a library of industrial plant component types using user input further comprises displaying a set of operators in a palette, dragging operators from the palette in accordance with user input, connecting the dragged operators in accordance with user input, and applying the operators to properties in accordance with user input.

3. A method in accordance with claim 1 wherein said assembling a configuration of industrial plant components from the library using user input further comprises displaying a plant diagram, displaying the industrial plant component types in a palette, and moving and instantiating user-selected industrial plant component types into the plant diagram in response to user input.

4. A method in accordance with claim 1 wherein said setting properties of said industrial plant components in said assembled configuration further comprises receiving signals from sensors sensing conditions of physical components in an industrial plant corresponding to industrial plant components in the assembled configuration.

5. A method in accordance with claim 1 applied to model a power generating plant.

6. A method in accordance with claim 1 applied to model a process plant.

7. A method in accordance with claim 1 wherein said generating a library of industrial plant component types using user input further comprises displaying a set of operators in a palette, dragging operators from the palette in accordance with user input, connecting the dragged operators in accordance with user input, and applying the operators to properties in accordance with user input,
   said assembling a configuration of industrial plant components from the library using user input further comprises displaying a plant diagram, displaying the industrial plant component types in a palette, and moving and instantiating user-selected industrial plant component types into the plant diagram in response to user input, and
   said setting properties of the industrial plant components in the assembled configuration further comprises receiving signals from sensors sensing conditions of physical components in an industrial plant corresponding to industrial plant components in the assembled configuration.

8. A method in accordance with claim 1 wherein results of the solution of the mathematical relationships are displayed.

9. A method in accordance with claim 1 wherein the industrial plant components include non-physical components.

10. A method in accordance with claim 1 further comprising validating the rules as they are generated.

11. A method in accordance with claim 1 further comprising optimizing results of the simulation in accordance with selected criteria.

12. A computer system having a display, a processor, a pointing device, and memory, wherein said memory includes instructions configured to instruct the processor to:
    generate a library of industrial plant component types using user input, wherein the library includes at least one economical component that represents at least one of a fuel purchase and a fuel sale, at least one legal component, and properties of one or more user-created component types and user-defined component types and existing component types, the library further including mathematical and text manipulation rules for use in generating scripts in accordance with property values;
    assemble a configuration of industrial plant components from the library using user input into an editor configured to accept a layout and connection of said configuration of industrial plant components and to accept a configuration of the properties of said industrial plant components; wherein the properties of said industrial plant components are set based on signals received from said assembled configuration;
    set properties of said industrial plant components in said assembled configuration;
    generate a script or scripts for said industrial plant components in said configuration of industrial plant components in accordance with said rules, wherein said generated scripts include mathematical relationships within or among the industrial plant components, or both;
    solve the mathematical relationships; and
    display results of said solution of the mathematical relationships.

13. A computer system in accordance with claim 12 wherein to generate a library of industrial plant component types using user input, said instructions are further configured to instruct said processor to display a set of operators in a palette, drag operators from the palette in accordance with user input, connect the dragged operators in accordance with user input, and apply the operators to properties in accordance with user input.

14. A computer system in accordance with claim 12 wherein to assemble a configuration of industrial plant components from the library using user input, said instructions are further configured to instruct said processor to display a plant diagram, display said industrial plant component types in a palette, and move and instantiate user-selected said industrial plant component types into the plant diagram in response to user input.

15. A computer system in accordance with claim 12 wherein to set properties of said industrial plant components in said assembled configuration, said instructions are further configured to instruct said processor to receive signals from sensors sensing conditions of physical components in an industrial plant corresponding to industrial plant components in said assembled configuration.

16. A computer system in accordance with claim 12 wherein to generate a library of industrial plant component types using user input, said instructions are further configured to instruct said processor to display a set of operators in a palette, drag operators from the palette in accordance with user input, connect the dragged operators in accordance with user input, and apply the operators to properties in accordance with user input,
  to assemble a configuration of industrial plant components from the library using user input, said instructions are further configured to instruct said processor to display a plant diagram, display said industrial plant component types in a palette, and move and instantiate user-selected said industrial plant component types into the plant diagram in response to user input, and
  to set properties of said industrial plant components in said assembled configuration, said instructions are further configured to instruct said processor to receive signals from sensors sensing conditions of physical components in an industrial plant corresponding to industrial plant components in said assembled configuration.

17. A machine-readable medium having recorded thereon instructions configured to instruct a computer system having a display, a processor, a pointing device, and memory, to:
  generate a library of industrial plant component types using user input, wherein the library includes at least one economical component that represents at least one of a fuel purchase and a fuel sale, at least one legal component, and properties of one or more user-created component types and user-defined component types and existing component types, the library further including mathematical and text manipulation rules for use in generating scripts in accordance with property values;
  assemble a configuration of industrial plant components from the library using user input into an editor configured to accept a layout and connection of said configuration of industrial plant components and to accept a configuration of the properties of said industrial plant components, wherein said properties of said industrial plant components are set based on signals received from said assembled configuration;
  set properties of said industrial plant components in said assembled configuration;
  generate a script or scripts for industrial plant components in said configuration of industrial plant components in accordance with said rules, wherein said generated scripts include mathematical relationships within or among the industrial plant components, or both;
  solve the mathematical relationships; and
  at least one of display results of said solution of the mathematical relationships and transmit signals in accordance with said results to control an industrial plant in accordance with said results.

18. A machine-readable medium in accordance with claim 17 wherein to generate a library of industrial plant component types using user input, said instructions are further configured to instruct said processor to display a set of operators in a palette, drag operators from the palette in accordance with user input, connect the dragged operators in accordance with user input, and apply the operators to properties in accordance with user input.

19. A machine-readable medium in accordance with claim 17 wherein to assemble a configuration of industrial plant components from the library using user input, said instructions are further configured to instruct said processor to display a plant diagram, display said industrial plant component types in a palette, and move and instantiate user-selected said industrial plant component types into the plant diagram in response to user input.

20. A machine-readable medium in accordance with claim 17 wherein to set properties of said industrial plant components in said assembled configuration, said instructions are further configured to instruct said processor to receive signals from sensors sensing conditions of physical components in an industrial plant corresponding to industrial plant components in said assembled configuration.

* * * * *